United States Patent
Stuck

(10) Patent No.: US 12,194,581 B1
(45) Date of Patent: Jan. 14, 2025

(54) SPLIT BUSHING ALIGNMENT ASSEMBLY AND METHOD OF USE

(71) Applicant: Michael J. Stuck, Charleston, WV (US)

(72) Inventor: Michael J. Stuck, Charleston, WV (US)

( * ) Notice: Subject to any disclaimer, the term of this patent is extended or adjusted under 35 U.S.C. 154(b) by 113 days.

(21) Appl. No.: 18/295,313

(22) Filed: Apr. 4, 2023

(51) Int. Cl.
*B23P 19/00* (2006.01)
*B23P 19/04* (2006.01)
*F16B 19/00* (2006.01)
*F16C 17/12* (2006.01)
*F16C 33/04* (2006.01)
*G01B 13/08* (2006.01)

(52) U.S. Cl.
CPC ......... *B23P 19/002* (2013.01); *B23P 19/04* (2013.01); *F16B 19/004* (2013.01); *F16C 17/12* (2013.01); *F16C 33/046* (2013.01); *G01B 13/08* (2013.01)

(58) Field of Classification Search
CPC .......... B23P 11/02; B23P 19/001–002; B23P 19/004–006; B23P 19/04; Y10T 29/49764; Y10T 29/49778; Y10T 29/4978; Y10T 29/4987–29/49872; Y10T 29/49945; Y10T 29/5363; Y10T 29/53657; Y10T 29/53987; Y10T 403/7058; G01B 13/08–10; G01B 13/16; F16B 19/004
See application file for complete search history.

(56) References Cited

U.S. PATENT DOCUMENTS 2,604,692 A * 7/1952 Broden .............. B65G 47/1428
29/709
3,982,679 A * 9/1976 White, Jr. .............. B23P 19/02
227/116

FOREIGN PATENT DOCUMENTS

EP 2053352 A2 * 4/2009 ............. G01B 13/08

* cited by examiner

*Primary Examiner* — Matthew P Travers
(74) *Attorney, Agent, or Firm* — Karen Tang-Wai Sutton

(57) ABSTRACT

A split bushing alignment assembly comprising an air tube and a mount having one or more vents leading to a bushing receiver disposed as a hole sized and shaped to receive a split bushing. A stream of air from an air supply, typically compressed air, enters the tube and exits the vent into the bushing receiver. When a split bushing having a gap falls into the bushing receiver, the stream of air rotates the split bushing if the gap is in a same location as the stream of air from the vent. The gap of the split bushing is thus rotated by the stream of air such that when the split bushing is installed, the gap is not located in a known inspection area of a bushing inspection machine. A method of use is also provided.

9 Claims, 15 Drawing Sheets

Determining a number and location of inspection areas of a split bushing as inspected by inspection machine
210

Providing an assembly with a bushing receiver having at least same number and at least a same location of vents as the number and location of inspection areas
215

Providing an air supply to each vent formed in the bushing receiver
220

Feeding the split bushing into the bushing receiver
230

Blowing stream of air from air supply through the vent or vents in the bushing receiver as the split bushing travels through the bushing receiver
240

Rotating the split bushing gap away from the vent or vents when the stream of air contacts the bushing gap
250

SPLIT BUSHING ALIGNMENT ASSEMBLY AND METHOD OF USE

CROSS-REFERENCE TO RELATED APPLICATIONS

NA

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of manufacturing, specifically, an assembly used with existing equipment to improve alignment of split bushings prior to installation by a bushing press machine and a method of using a quantity of air with a bushing receiver to align split bushings prior to installment.

Background Art

Bushings are thin tubes commonly used for machinery with rotating or sliding shafts to improve efficiency and reduce vibration and noise. Split bushings feature a slit or gap formed through one side of the bushing, allowing the bushing to join different diameter tubes, for instance, in a cost-effective manner.

The use of a split bushing however can create production issues with existing equipment because the location of the gap can cause the bushing to be rejected by automatic machine tolerances checking the quality of the bushing used. For instance, in the automobile industry, an internal combustion engine for an automobile uses a connecting rod comprised of a steel rod having a crankshaft end that is machined directly into the rod, and a piston end into which a split bushing is pressed approximately halfway through the production line. Split bushings are used so that when the bushing is pressed into the rod, the gap closes.

Problems arise however when the bushing, which is positioned by a gravity feed rail prior to being pressed into the connecting rod, ends up with the gap aligned in an unfavorable area, namely, one of the predetermined inspection areas the inspection machine uses to check the bushing's tolerances. A commonly used inspection machine has four inspection areas where it uses compressed air to check the circularity and diameter of the installed bushing in the part, and thus if a gap in the bushing is not completely closed and falls into one of these four inspection locations, the bushing fails inspection and the production line is slowed. The inspection machine is designed to catch low quality bushings, however even bushings that are consistent with specifications can fail testing due to a random alignment of the gap with one of these four locations. The inspection machine will detect an air leak, signaling that the bushing is out of tolerance and then automatically label the part as scrap, and eject it instead of continuing the assembly. Thus, the bushing's gap location is critical, and parts rejected due to improper gap alignment causes waste of parts and slowdowns in production. A commonly used feed rail machine randomly positions the split bushing onto the press pin, and thus if the gap is not in one of the inspection locations, the bushing passes inspection and proceeds through the assembly process.

Since the feed rail machine feeding the split bushing to the press pin has no way of controlling the orientation of the gap, a percentage of split bushings are rejected as defective due to the gap randomly falling into one of the inspection locations. This results in unnecessary waste, and production delays.

Thus, what is needed is an assembly that reliably positions the gap of the split bushing away from the inspection locations tested by the inspection machine.

What is also needed is for the assembly to be fitted onto existing equipment easily and without requiring significant modification of the existing equipment.

What is still also needed is an assembly that is inexpensive and simple to operate and yet can consistently align the gap away from the four problematic locations.

Finally, what is also needed is a method of aligning the gap of a split bushing to improve production efficiency and limit the number of parts rejected due to misalignment of the gap.

DISCLOSURE OF INVENTION

The invention is a split bushing alignment assembly and a method of using a stream of air to align a split bushing prior to installation. The assembly comprises an air tube with an inlet and an outlet, and a mount formed with a bushing receiver having a hole sized and shaped to receive a split bushing, the bushing receiver further formed with a vent having at least a same or larger size and shape as compared to a size and shape of the outlet. The vent of the bushing receiver is formed at a predetermined position in the bushing receiver corresponding to a bushing inspection position of a bushing inspection machine, and a total number of air tubes and vents of the assembly is a same number as a number of inspection positions of the bushing inspection machine. The inlet is adapted to be attached to an air supply and the outlet is positioned by the mount such that a stream of air from the air supply enters the air tube at the inlet and exits the outlet at the vent and into the hole of the bushing receiver. The stream of air from the air supply simultaneously exits all vents in the mount.

In a first aspect of the assembly, the mount of the assembly, when used with a feed rail, is further comprised of a rail base support having a base inlet adapted to receive the outlet of the air tube with an interior passageway connecting the base inlet to the vent of the bushing receiver. The rail base support is positioned below the rail feed of a rail feed machine with the hole of the mount aligned with an aperture of the feed rail, wherein the split bushing first falls through the aperture of the feed rail and then through the hole of the bushing receiver.

In yet a second aspect of the invention, the mount of the assembly is further comprised of a vertical rail attached to the base rail support, with the vertical mount removably affixed to the rail feed of the rail feed machine.

In a third aspect of the invention, the supply of air is a compressed air supply with the stream of air calibrated according to a weight of the split bushing. In one embodiment, the stream of air used is about 40 psi with a split bushing weighing about 16 grams.

In a fourth aspect of the invention, the inlet of the air tube is positioned by the mount, and the mount is formed with an inner passageway joining the inlet to the vent so as to create an air passageway within the mount separate from the air tube. When there is more than one vent, the inner passageway in one embodiment is bifurcated such that the stream of air entering the inlet and then the inner passageway, exits two different vents.

In a fifth aspect of the invention, the method aligns a gap of a split bushing using an assembly comprising a bushing receiver formed a hole sized and shaped to receive the split bushing. The method comprises the steps of determining a number and location of inspection areas about a circumference of an installed split bushing as inspected by the inspection machine, providing an assembly with a same number and a same location vents as the number and location of inspection areas, providing an air supply to each vent, feeding the split bushing into the hole, blowing a stream of air through each vent into the hole as the split bushing travels through the hole, and rotating the gap of the split bushing away from the vent when the gap is positioned at a vent and the stream of air contacts the gap.

In a sixth aspect of the invention, the method identifies four test locations in spaced apart relationship corresponding to four inspection locations of the inspection machine.

In yet a seventh aspect of the invention, a single air supply is used to provide the stream of air.

In an eighth aspect of the invention, the air supply is a supply of compressed air regulated and calibrated so as to provide sufficient air pressure to rotate a split bushing of a predetermined weight when the stream of air contacts the gap.

In yet a ninth aspect of the invention, the step of blowing occurs only when the split bushing is positioned within the bushing receiver.

In yet a tenth aspect of the invention, the method further comprises the step of installing the split bushing into a bushing receiving part immediately after the step of rotating, and further comprises the step of testing after the step of installing.

In yet an eleventh aspect of the invention, the stream of air has a pressure of about 40 psi and the split bushing has a weight of about 16 grams.

BRIEF DESCRIPTION OF THE DRAWINGS

The features and advantages of the invention will become apparent from a consideration of the subsequent detailed description presented in connection with accompanying drawings, in which:

FIG. 16 is a diagrammatic representation of the method of using a stream of air to align a gap of a split bushing.

DRAWINGS LIST OF REFERENCE NUMERALS

Figure 1:
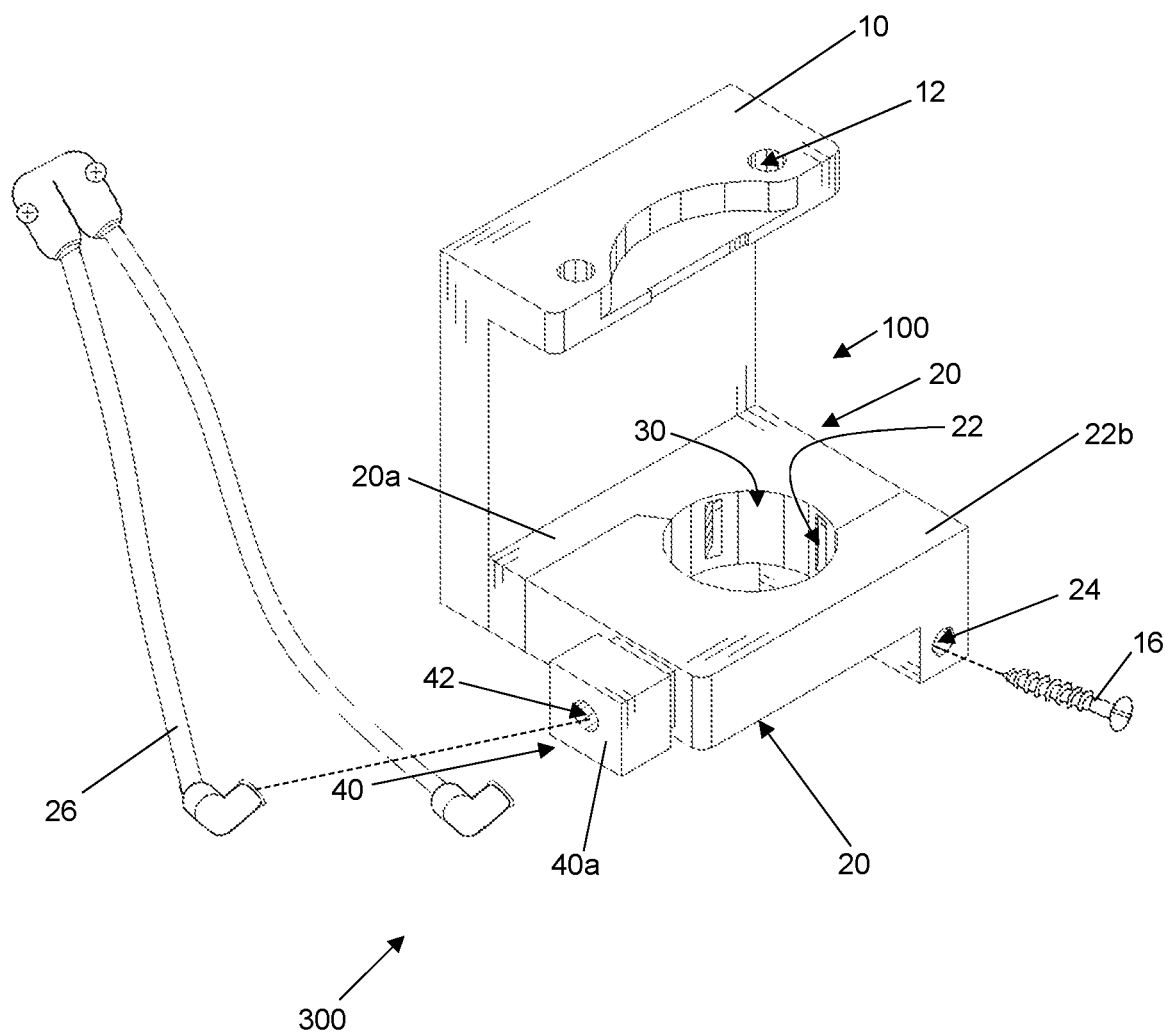
FIG. 1 is a perspective view of a bushing alignment assembly according to the invention.
Figure 2:
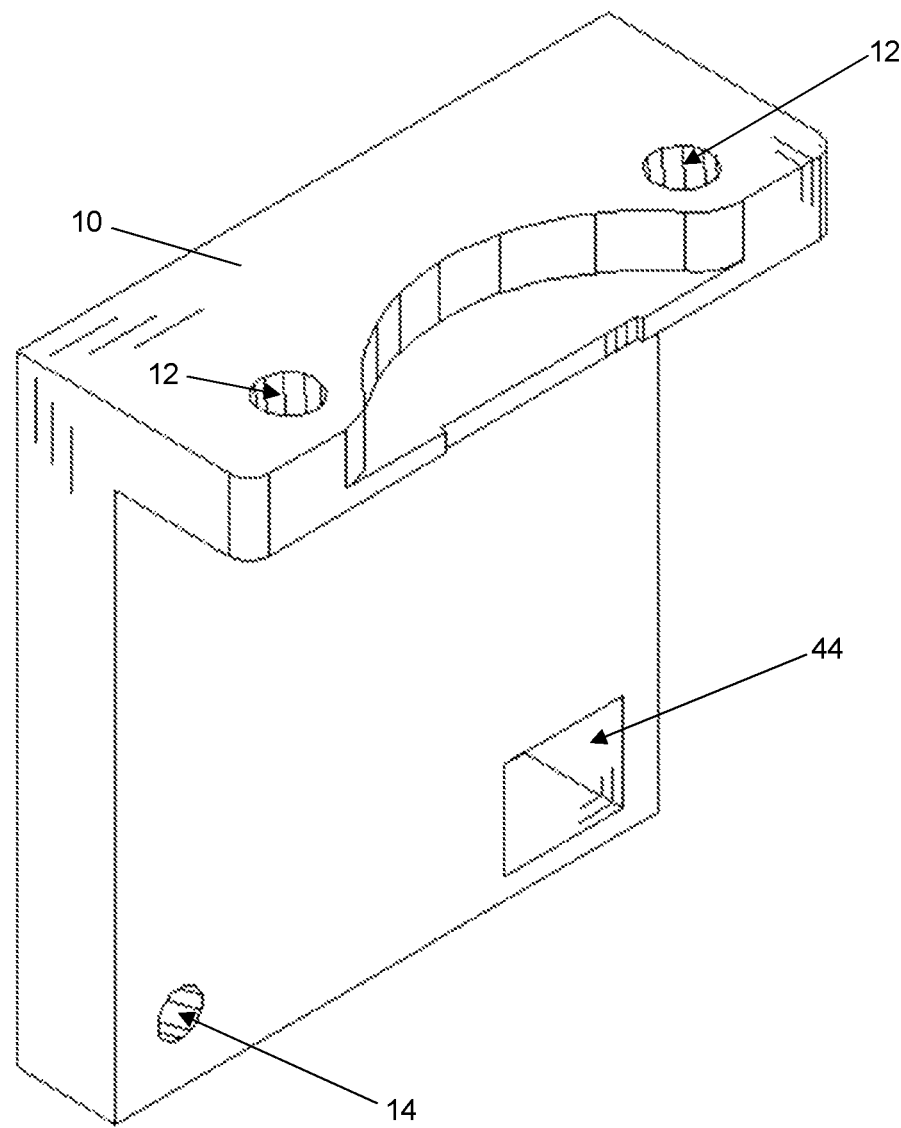
FIG. 2 is a perspective view of a vertical rail support according to the invention.
Figure 3:
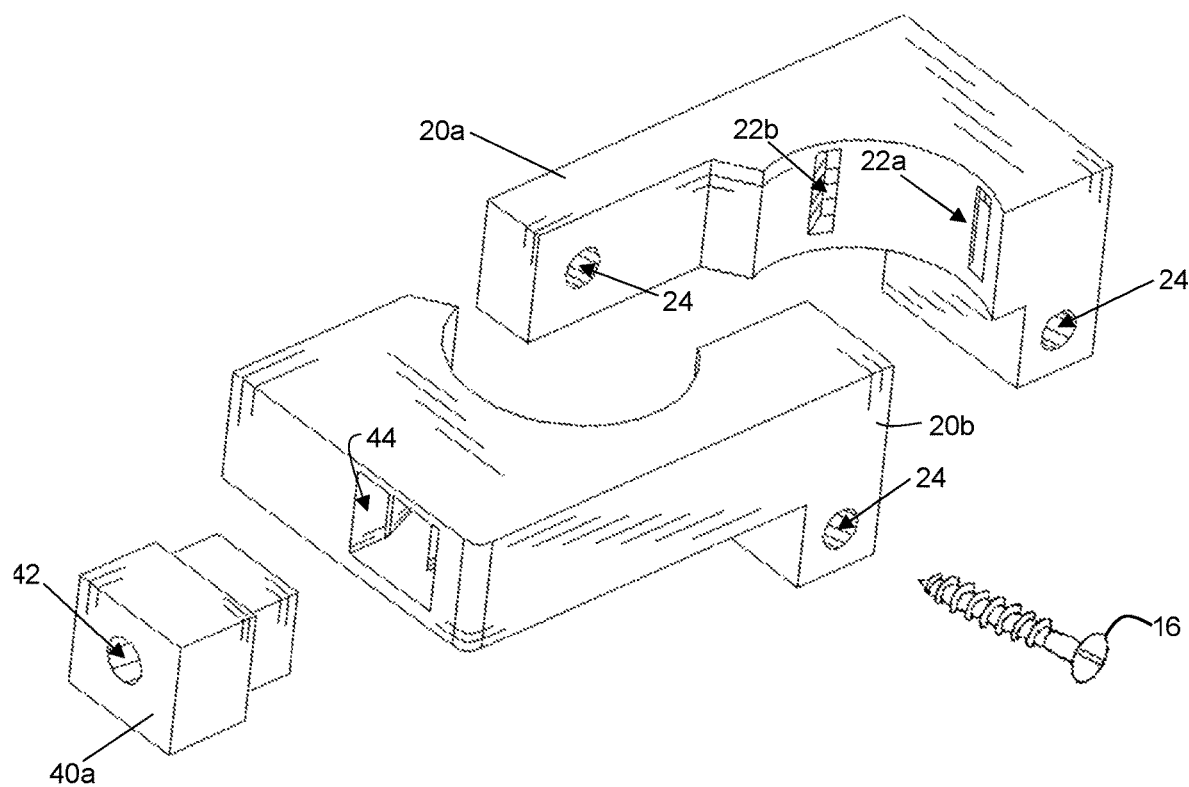
FIG. 3 is an exploded view of a base rail support according to the invention.
Figure 4:
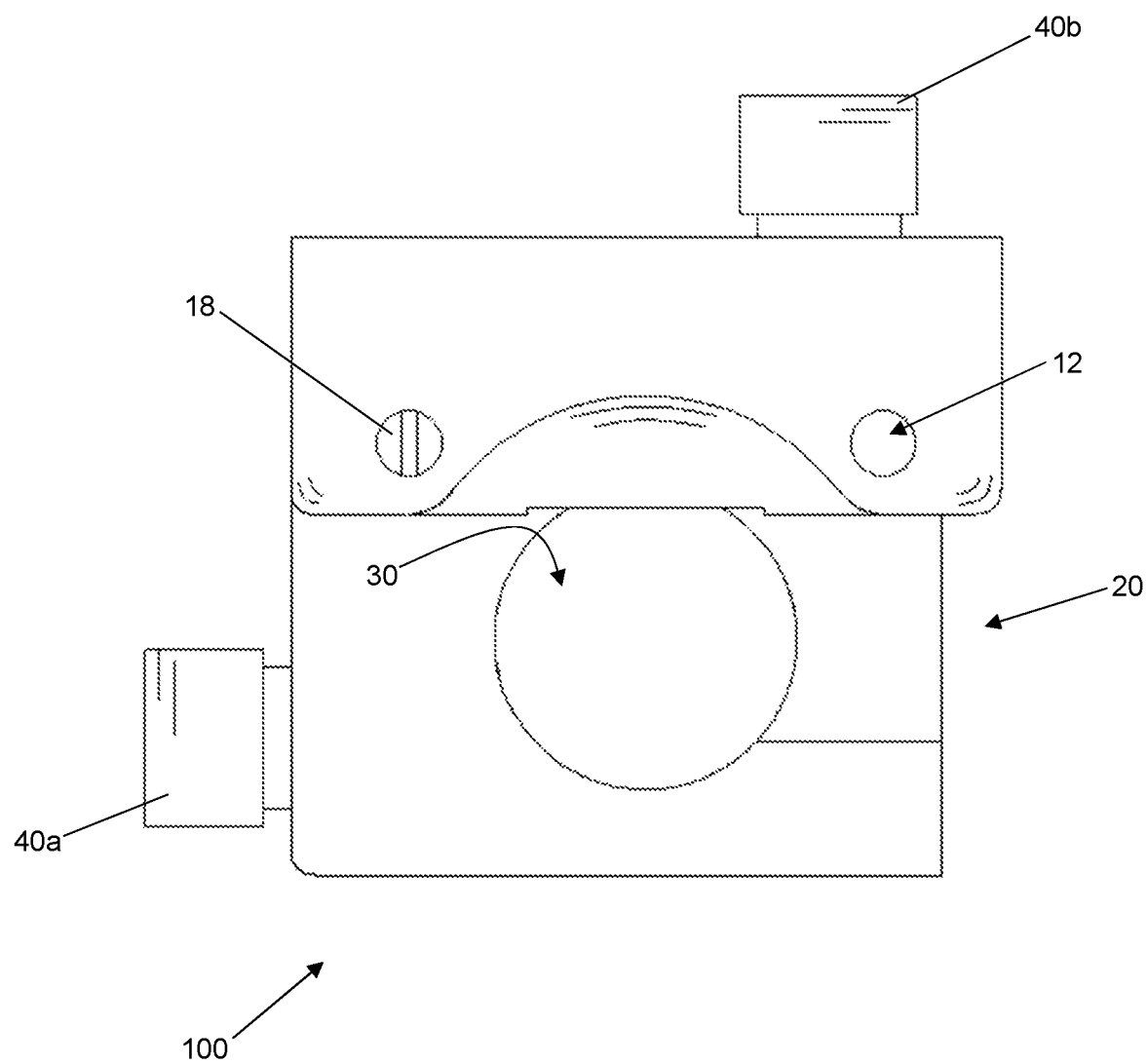
FIG. 4 is a top view of the bushing alignment assembly in FIG. 1.
Figure 5:
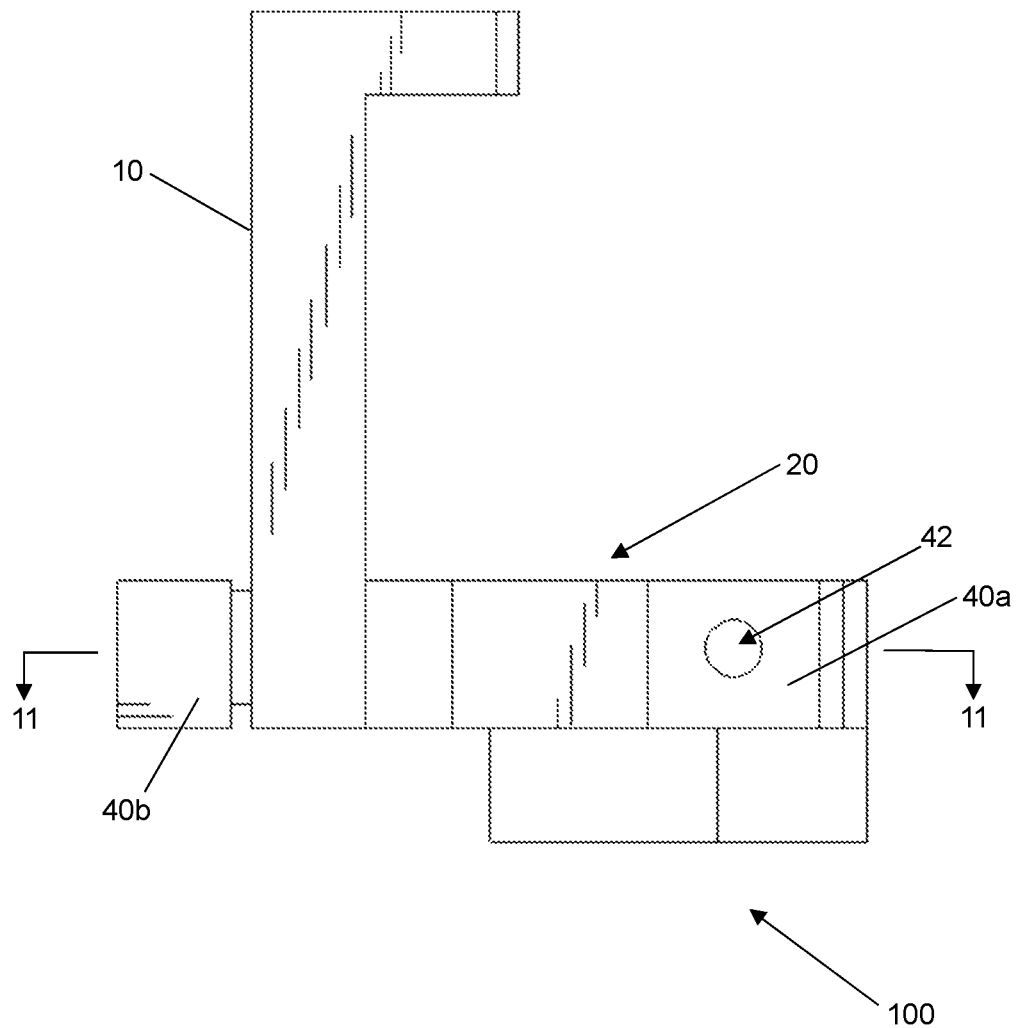
FIG. 5 is a first side elevation view of the bushing alignment assembly in FIG. 1.
Figure 6:
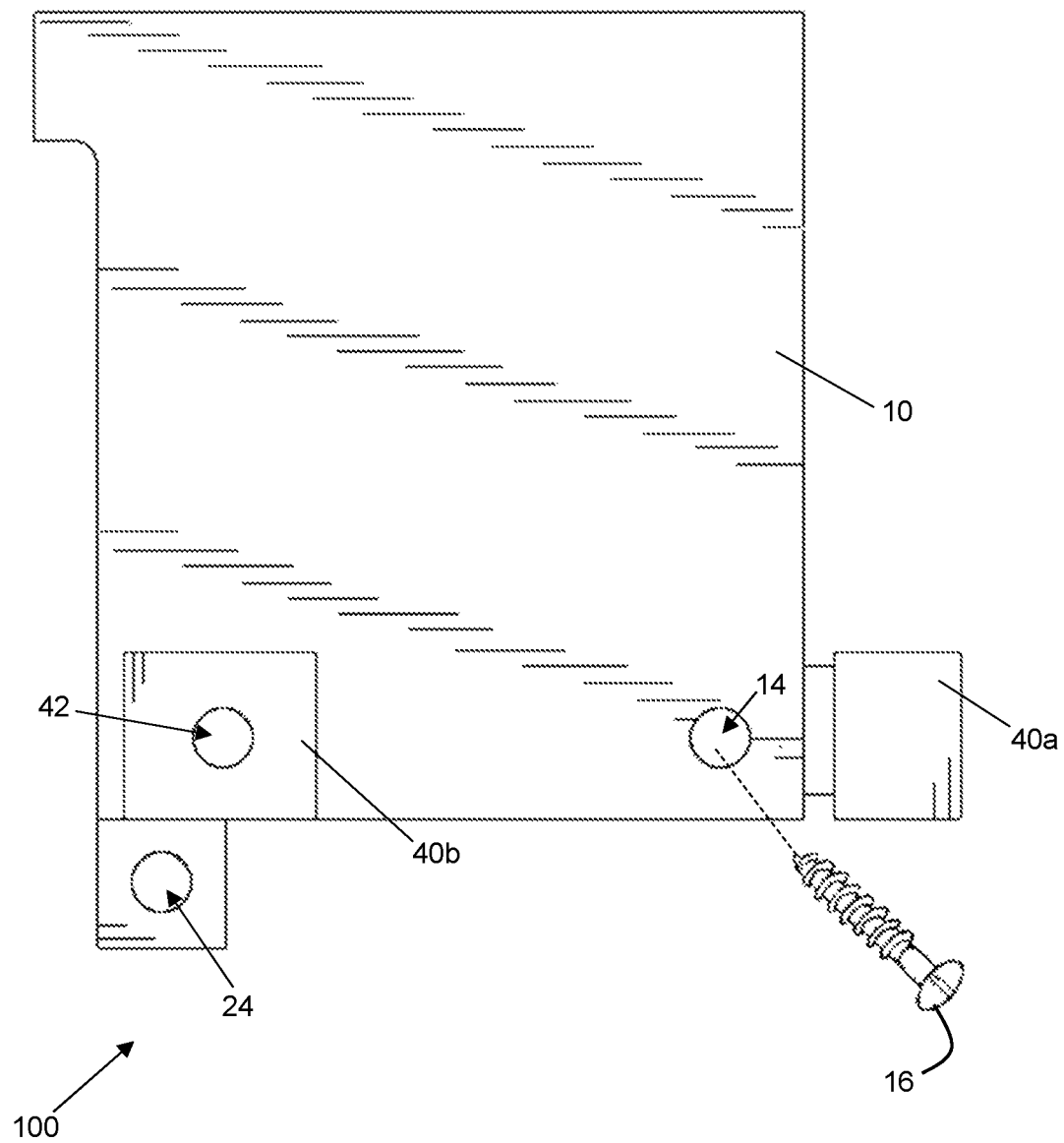
FIG. 6 is a back elevation view of the bushing alignment assembly in FIG. 1.
Figure 7:
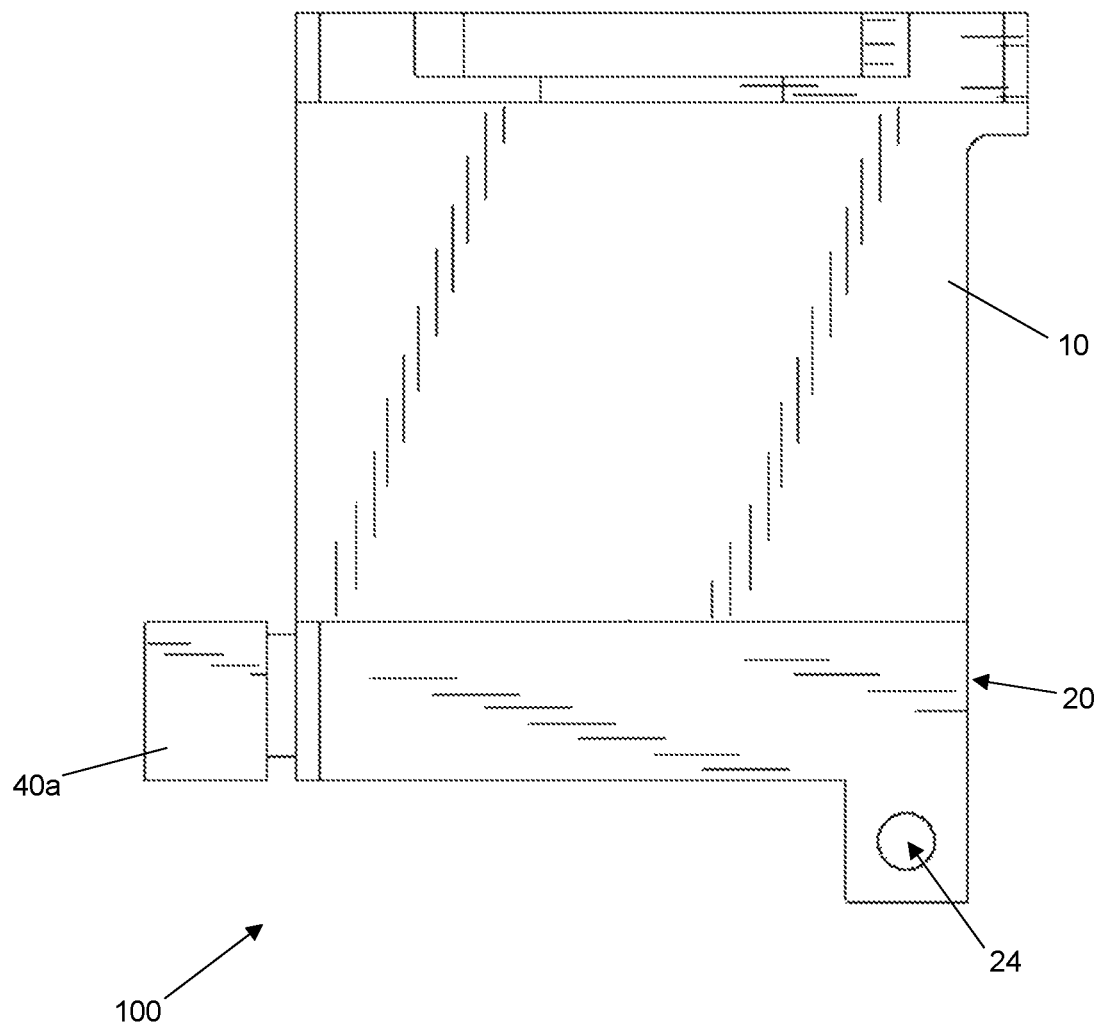
FIG. 7 is a front elevation view of the bushing alignment assembly in FIG. 1.

The following is a list of reference labels used in the drawings to label components of different embodiments of the invention, and the names of the indicated components:

10 vertical rail support
12 rail fastener hole
14 fastener hole to base rail support
16 fastener for base and vertical rail supports
18 fastener to feed rail
20 base rail support
20*a* first base member
20*b* second base member
22 opening or vent or outlet
22*a* first vent or first outlet
22*b* second vent or second outlet
22*c* third vent or third outlet
22*d* fourth vent or fourth outlet
24 base fastener hole
30 bushing alignment hole
40 inlet block
40*a* first inlet block
40*b* second inlet block42
42 base air inlet
44 block opening
46 air passageway inside base rail support
60 feed rail
62 bushing drop channel
64 bushing feed path
68 bushing aperture
80 split bushing or bushing
82 bushing gap or gap 100 mount
200 method
210 first step
215 second step
220 third step
230 fourth step
240 fifth step
250 sixth step
300 bushing alignment assembly

DETAILED DESCRIPTION

Figure 8:
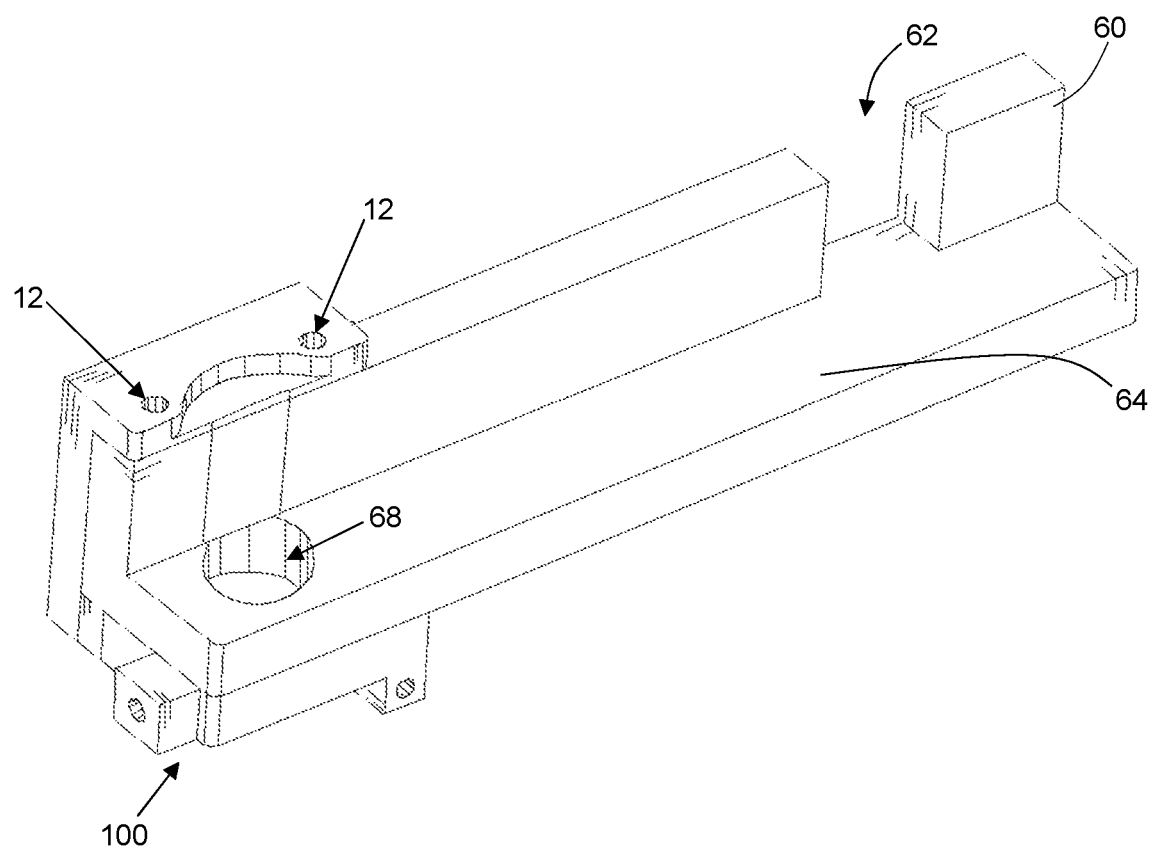
FIG. 8 is a second perspective view of the bushing alignment assembly according to the invention, shown as it would appear when installed onto an existing feed rail of a bushing press machine.
Figure 9:
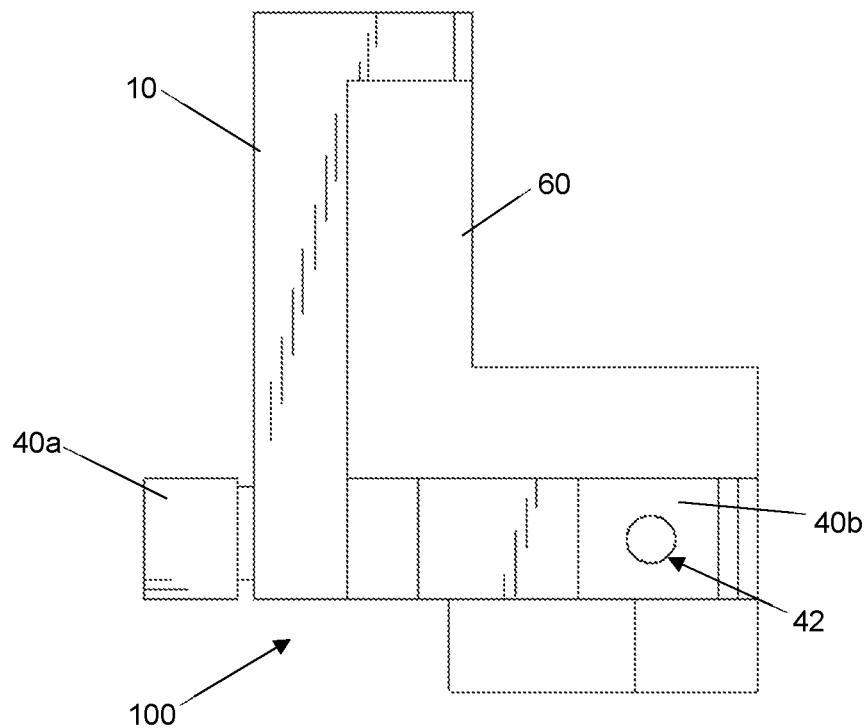
FIG. 9 is a side elevation view of FIG. 8.
Figure 10:
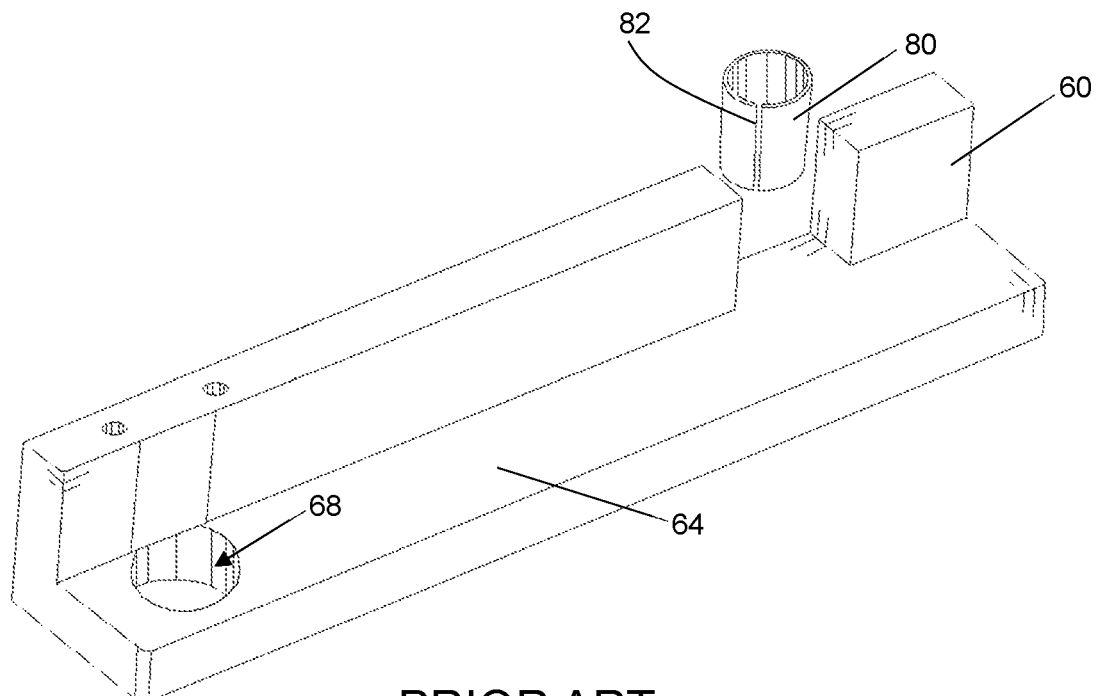
FIG. 10 is a perspective view of the feed rail in FIG. 8, shown with a split bushing.
Figure 11:
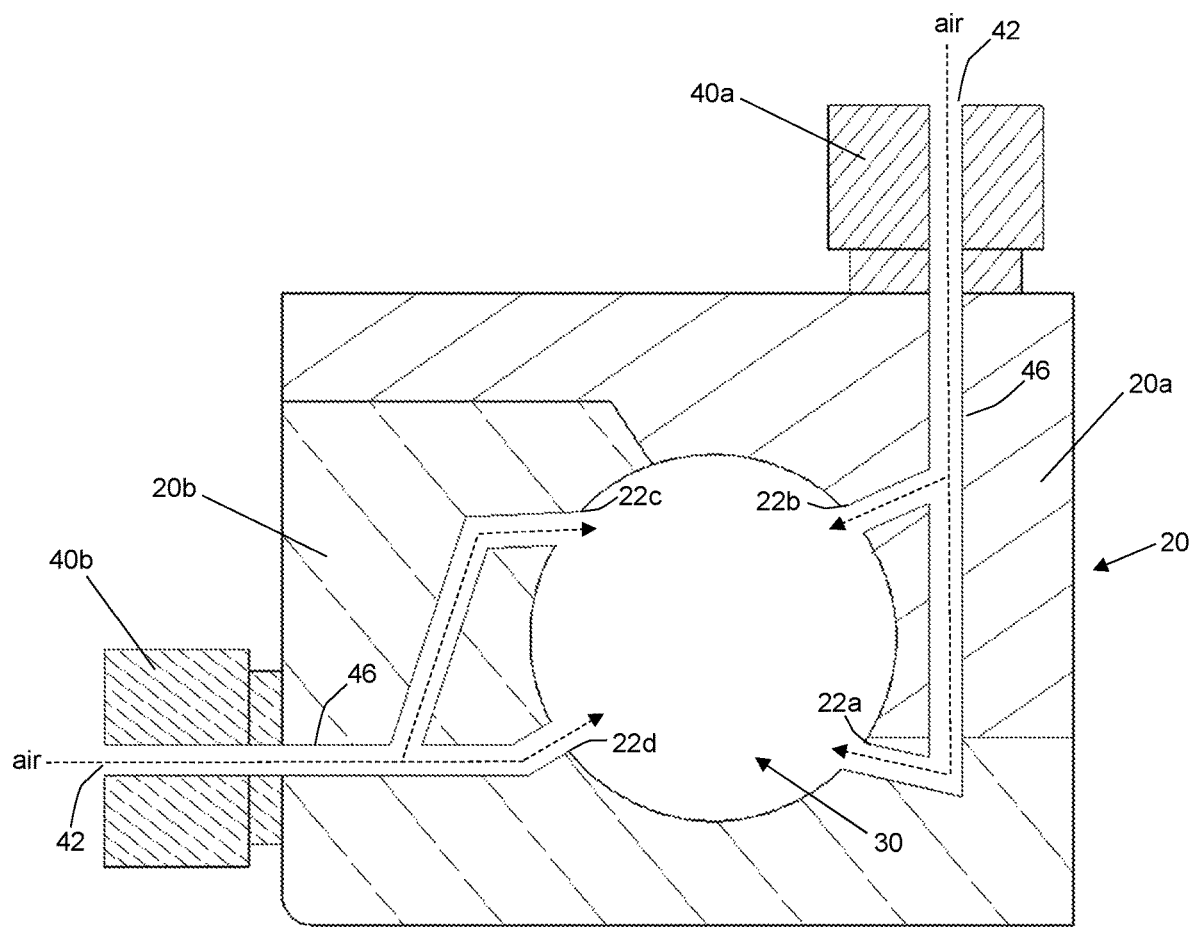
FIG. 11 is a diagrammatic representation of air flow through the assembly and exiting into a bushing alignment hole in a center of the assembly.

An assembly to align a gap 82 of a split bushing 80 according to the invention or assembly 300 is shown in FIG. 1, comprising an air supply structure, such as one or more air tubes 26 affixed to a mount 100 shown in FIGS. 2-7 and 14-15 and used with an air supply source, typically compressed air (not shown). FIGS. 8-10 show how the assembly 300 is used with a prior art feed rail 60. FIG. 11 shows air flow through the mount 100, with FIGS. 12-13 specifically showing how air is used to rotate the split bushing 80 by acting on the gap 82 and thus turning the gap 82 away from one of four total inspection areas of a prior art inspection machine used to assess a circularity of the split bushing 80 and thus describes a method 200 for using the assembly 300 in the embodiment shown in the FIGS. FIG. 16 is a diagrammatic representation of the method 200 of using a stream of air to align the split bushing 80 to avoid inspection failure due to the gap 82 installed in an inspection area of the prior art inspection equipment.

Turning to the FIGS., the assembly 300 is comprised of one or more air tubes 26 removably affixed to the mount 100. The mount 100 is comprised of a vertical rail support 10 affixed to a bipartite base rail support 20. The vertical rail support 10 and the base rail support 20 are further formed with block openings 44, each block opening 44 sized and shaped to receive an inlet block 40 40a 40b. The mount 100 has two block openings 44 and receives a total of two inlet blocks 40a 40b in the embodiment shown in the FIGS. The vertical rail support 10 is further formed with a pair of fastener holes 14 sized to receive rail fasteners 12 to affix the assembly 300 to a prior art feed rail 60, shown best in FIG. 8 where the mount 100 is shown installed on the feed rail 60.

The bipartite base rail support 20 is further comprised of a first base member 20a and an identical second base member 20b. Each of the first and second base members 20a 20b is approximately L-shaped, with a semi-circular middle portion formed inside the "L". When the first and second base members 20a 20b are assembled, a void or through-hole, configured in the FIGS. as a circular bushing alignment hole 30 is formed in a center of the base rail support 20. The bushing alignment hole 30 is also referred to in this disclosure as a bushing receiver and is used to further guide the split bushing 80 and potentially rotate the gap 82 of the split bushing 80 as needed. The split bushing 80 thus momentarily travels through the bushing alignment hole 30 or bushing receiver before continuing onto its next step in a manufacturing process.

Each of the first and second base members 20a 20b is further formed with a pair of fastener holes 24 at opposite ends of the "L" shape, and the block opening 44 formed into the first base member 20a receives a second inlet 40b inserted into both the vertical rail support 10 and into the first base member 20a. The block opening 44 formed into the second base member 20b receives a first inlet block 40a. The first and second inlet blocks 40a 40b are each formed with a through hole or base air inlet 42 sized and shaped to securely receive the air tube 26. The block opening 44 in each of the first and second base members 20a 20b leads to an internal passageway 46 that splits to form a pair of spaced apart passageways, each internal passageway terminating in an opening or vent or outlet 22. Hence the assembly base rail support 20 has a total of four internal air passageways 46 and four outlets 22a 22b 22c 22d. The passageways 46 and the outlets 22a 22b 22c 22d are in fact extensions of an outlet end of the air tube 26 of the assembly 300.

The first and second base members 20a 20b are arranged such that the first base member 20a is positioned against the vertical rail support 10, aligning its base fastener hole 24 with a base fastener hole 14 formed into the vertical rail support 10, with a fastener 16 securing the parts together. The second base member 20b is secured to the first base member 20a by a second fastener 16 positioned into the aligned base fastener holes 24 of the first and second base members 20a 20b.

The outlets 22 of the first base member 20a are shown in the FIGS. as a first outlet 22a and a second outlet 22b. The second base member 20b has a third outlet 22c and a fourth outlet 22d. The outlets 22a 22b 22c 22d are distributed equally about a circumference of the bushing alignment hole 30 and the position of each outlet 22a 22b 22c 22d corresponds to an inspection location of the prior art inspection machine (not shown) used to test the circularity of the split bushing 80 at predetermined inspection locations. In the present case, the assembly 300 shown in the FIGS. is configured for use with an inspection machine having four circularity inspection locations. If the prior art inspection machine has three inspection locations, the mount 100 is modified to have three outlets 22 with each outlet 22 corresponding to one of the inspection locations of the inspection machine and the assembly 300 is also modified to include three air tubes 26 and thus three base air inlets 42 corresponding to the three outlets 22.

Turning to FIG. 8, the mount 100 is positioned at directly below the prior art feed rail 60 and aligned so that a bushing aperture 68 of the feed rail 60 is directly aligned above the bushing alignment hole 30 of the mount 100. The mount 100 is secured to the feed rail 60 by two rail fasteners 18 secured in the two rail fastener holes 12.

The split bushing 80 enters the feed rail 60 by falling through a bushing drop channel 62 and is then pushed along a bushing feed path 64, subsequently falling into the bushing aperture 68 then into the bushing alignment hole 30 of the mount 100, where the air supply source (not shown) and two air tubes 26 leading from the air supply source to the base air inlets 42 direct a stream or streams of air from the air supply source though the internal passageways 46, exiting the outlets 22a 22b 22c 22d, the streams of air hitting the split bushing 80. If the gap 82 is positioned at one of the outlets 22a 22b 22c 22d, the stream of air at that particular outlet rotates the split bushing 80 and moves the gap 82 away from the outlets 22a 22b 22c 22d. As the outlet locations correspond to the inspection locations of the inspection machine, rotation of the gap 82 away from these areas results in the split bushing 80 passing inspection.

The inventor notes that compressed air sources and air tubes 26 are common and inexpensive equipment used with the assembly 300. The inventor notes that one advantage of his assembly 300 and method 200 is that they are specifically designed to allow the assembly 300 to be installed and used without requiring the prior art equipment to be recalibrated, reconfigured or otherwise disassembled to accommodate the assembly 30 and the air supply source. Notably, the assembly 300 and method 200 are adaptable to many different equipment set ups and thus is not specific to any prior art machine. The assembly 300 described in the FIGS. is for a specific type of feed rail 60 and designed to efficiently use existing space below the feed rail 60 to eliminate the random position of the gap 82 as it drops through the bushing aperture 68 of the feed rail 60 to a prior art press pin (not shown). The inventor notes the importance of the stream of air directed at the split bushing 80 be directed at a circumference of the split bushing. In the FIGS., the stream of air hits an outer circumference of the split bushing however it is also possible to direct the stream or multiple streams of air so as to hit an inner circumference of the split bushing 80 and achieve a same result, or contact the split bushing from above or below, and a decision to direct the stream or streams of air at the inner or outer circumference may depend on a configuration of existing equipment and available space for tubing 26, etc.

Figure 12:
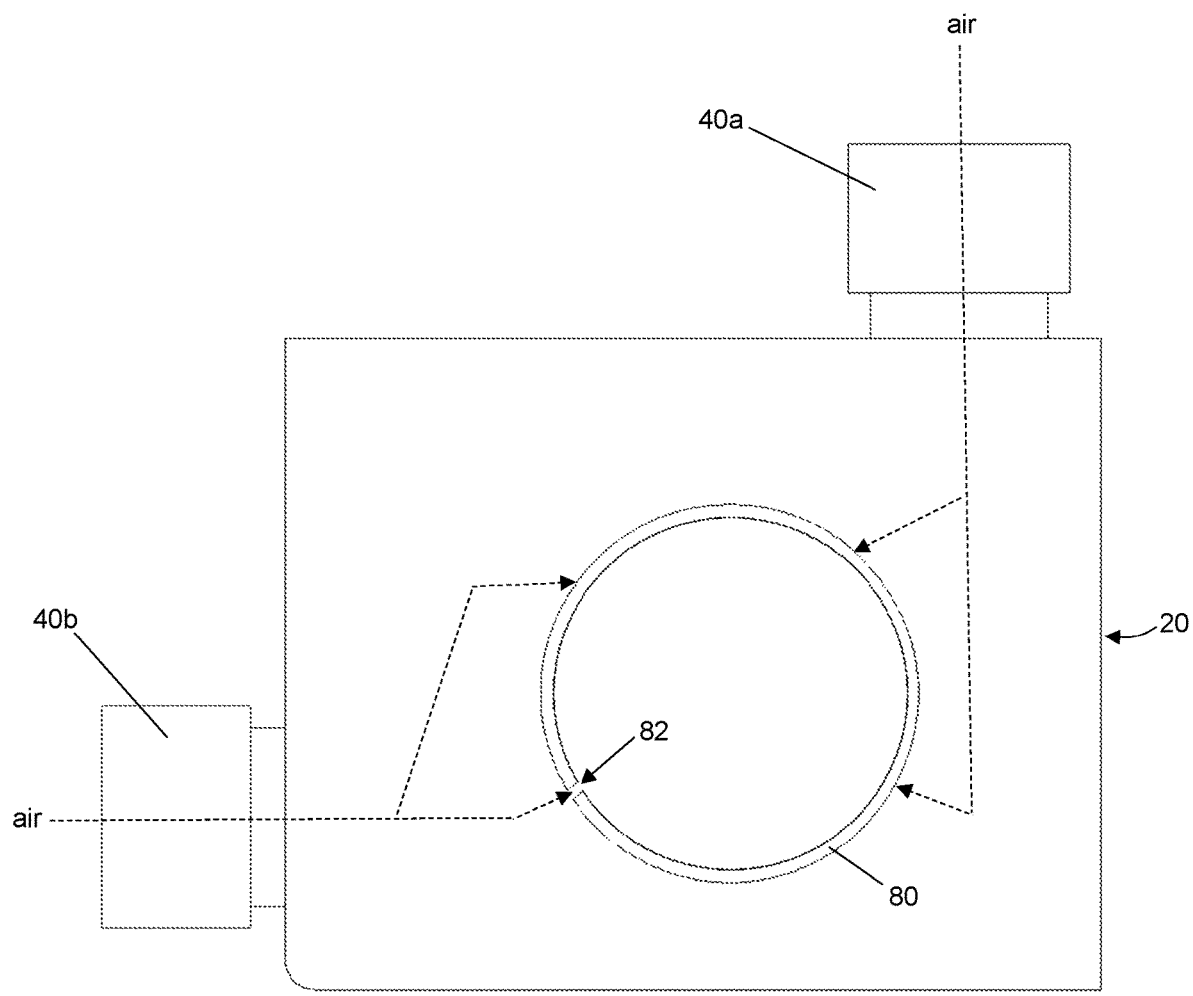
FIGS. 12 and 13 are diagrammatic representations of the bushing alignment assembly using a method of directing a stream of air at the bushing in the bushing alignment hole. When a gap of a split bushing aligns with one of the air outlets (FIG. 12) in the assembly, the stream of air turns the split bushing and reorients the gap (FIG. 13).
Figure 13:
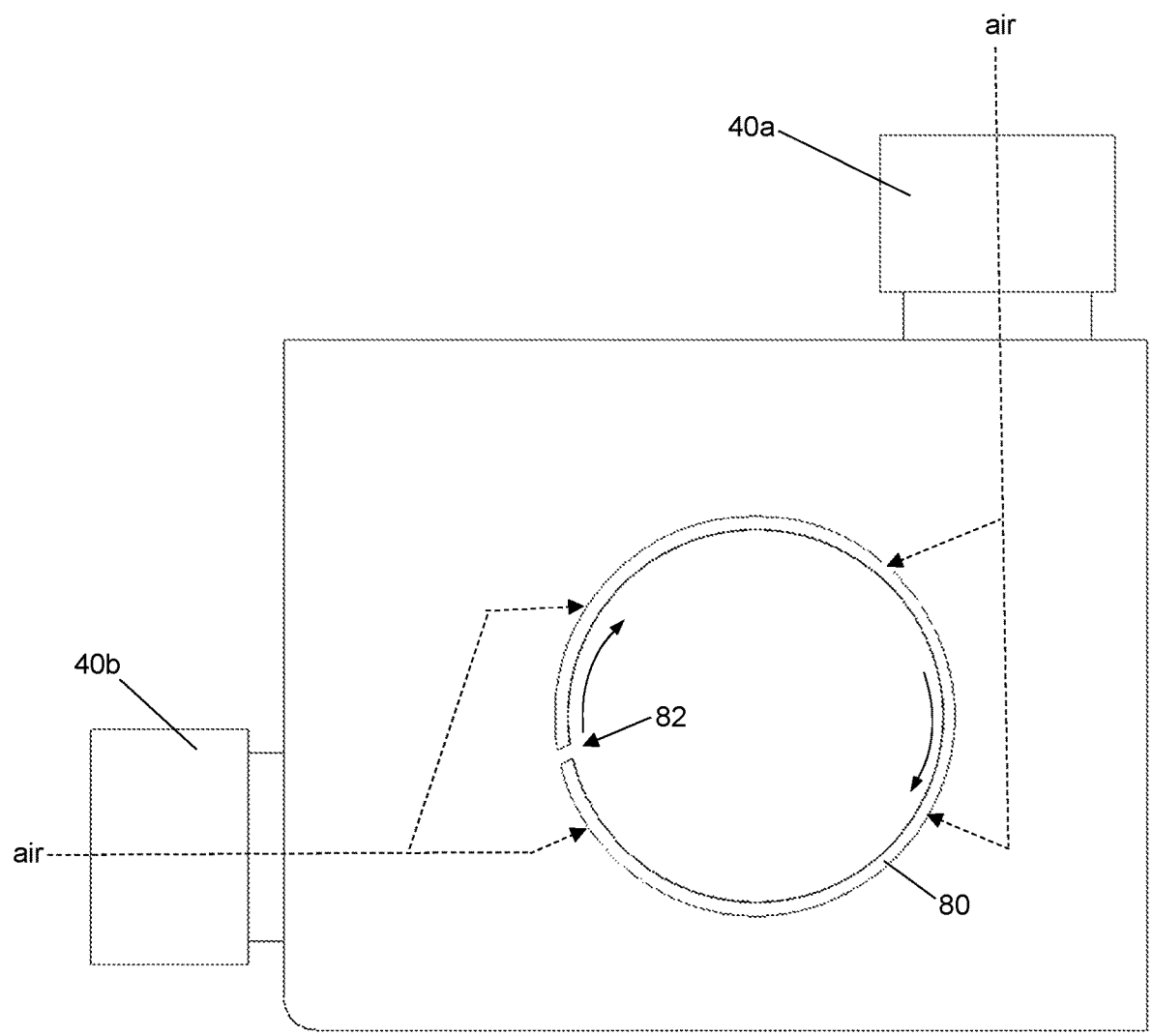
Figure 14:
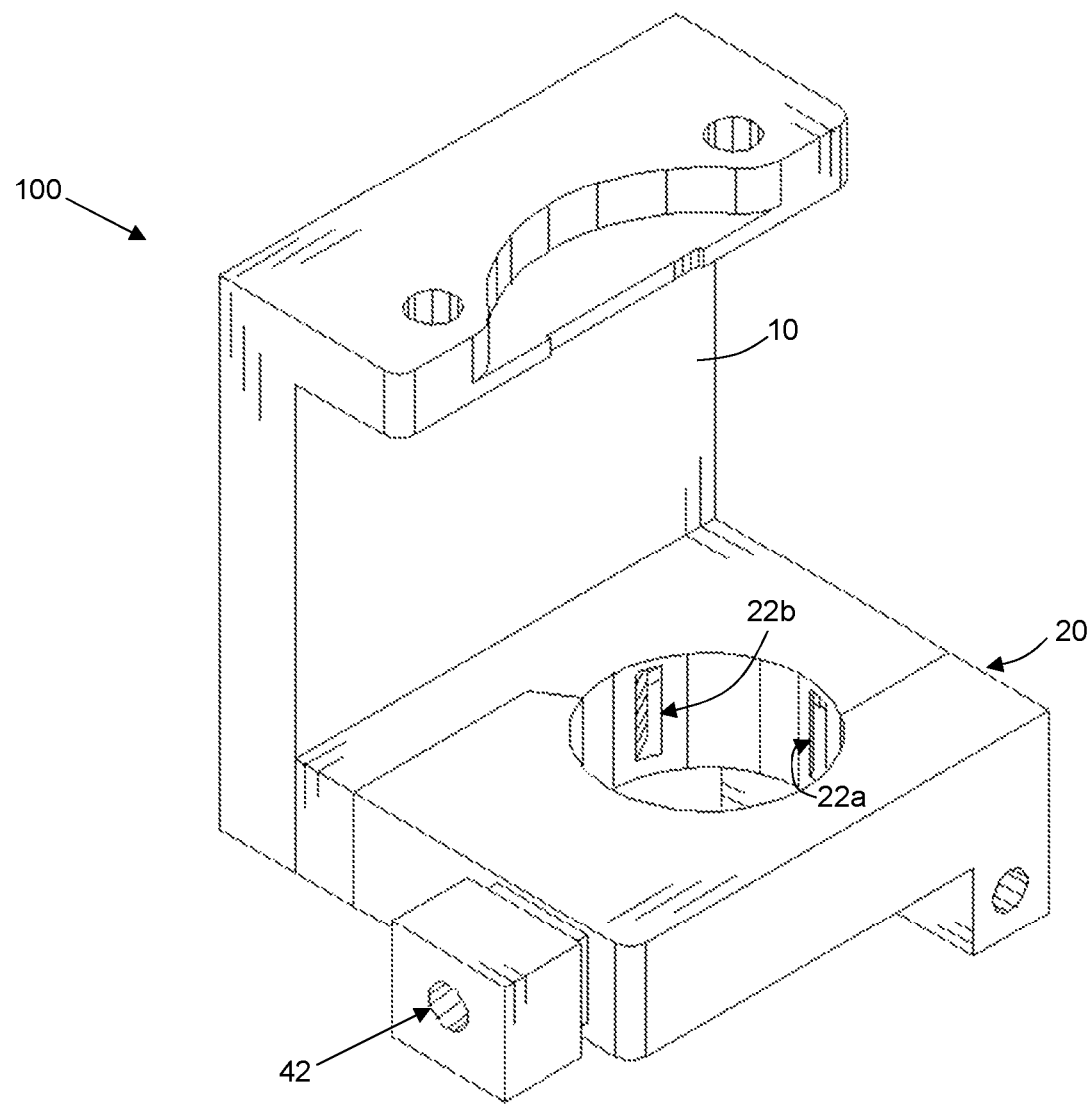
FIG. 14 is a second perspective view of the bushing alignment assembly in FIG. 1 showing a first and second outlets in the bushing alignment hole.
Figure 15:
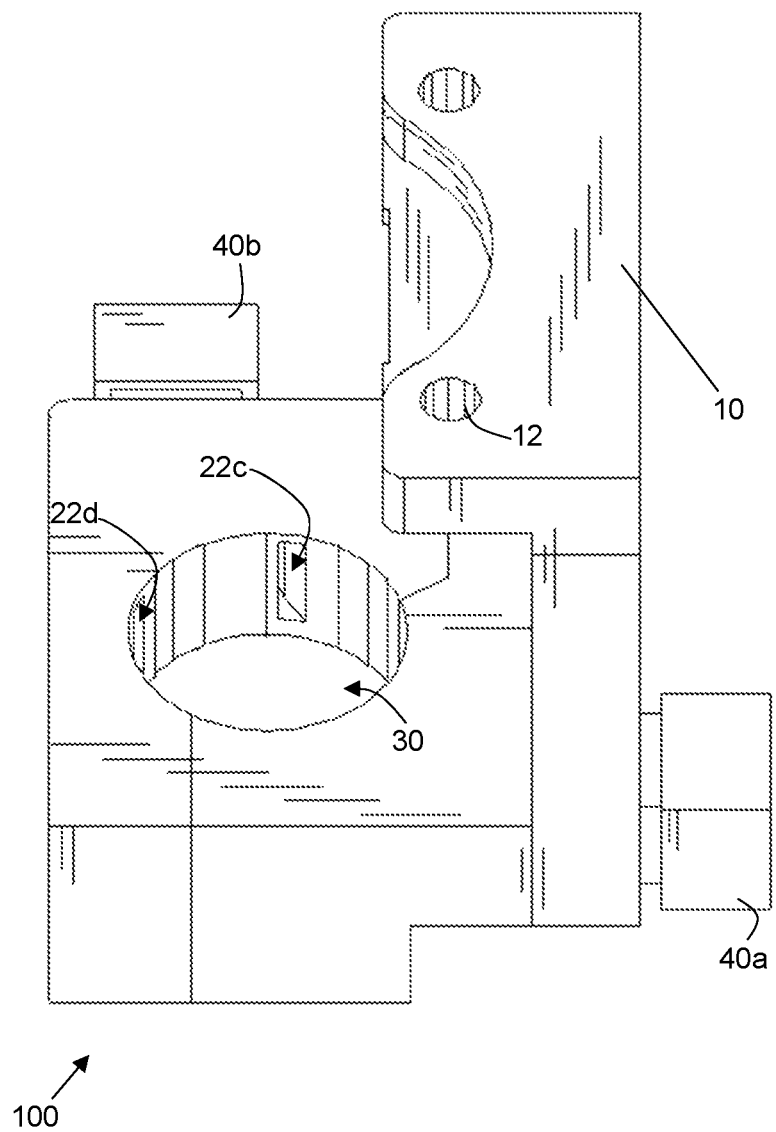
FIG. 15 is a third perspective view of the bushing alignment assembly in FIG. 1 showing a third and fourth outlets in the bushing alignment hole.

FIG. 11 is a diagrammatic representation of air flow through the mount 100, with FIG. 12 showing the split bushing 80 with the gap 82 positioned near the fourth outlet 22*d*, one of the four critical inspection areas. The stream of air exiting the fourth outlet 22*d* makes contact with the gap 82, rotating the split bushing 80 to move the gap 82 as shown in FIG. 13 so that the split bushing 80 will pass the inspection machine circularity testing. The inventor has discovered that directing a quantity of compressed air at the gap 82 rotates the split bushing 80 just enough to move the gap 82 away from the inspection area. Directing the air flow at solid portions of the split bushing 80 is less effective at rotating the bushing within the bushing alignment hole 30. As the split bushing 80 is freely falling through the bushing alignment hole 30 (bushing receiver) before being positioned onto the press pin of the prior art equipment, the stream of air must act quickly to rotate the gap 82 sufficiently out of the inspection location.

FIG. 16 is a flow diagram showing steps in the method 200 for repositioning the gap 82 of the split bushing 80 away from the inspection test sites of the prior art inspection machine. The steps shown refer to generic equipment and not to the specific assembly 300 in FIGS. 1-15. In a first step 210, the inspection machine is inspected to determine a number and location of inspection or test areas of the split bushing 80 made by the inspection machine. In a second step 215, an assembly having a same number and a same location vents as the number and location of inspection areas is provided. In a third step 220, an air supply is supplied to each vent formed in the bushing receiver; in the embodiment shown in the FIGS. the bushing receiver corresponds to the bushing alignment hole 30 and the vents correspond to the outlets 22*a* 22*b* 22*c* 22*d*. The air is supplied via a number of different structures, including air tubes and other air passageways formed into a mount structure or otherwise. In a fourth step 230, the split bushing 80 is fed into the bushing receiver, and in a fifth step 240 an air stream from the air supply is blown at the split bushing through the vent or vents in the bushing receiver. In a sixth step 250, if the gap 82 of the split bushing 80 is located at one of the vents, the stream of air hits the gap 82 and rotate the entire split bushing to relocate the gap 82 away from the vent and the air stream.

The inventor notes that for the method 200, one or more air outlets of air tubes 26 attached to the air supply are selected and positioned in a same number and location as the identified test areas of the inspection machine, and ideally this is accomplished by using a bushing receiver with vents located at the critical inspection areas of the inspection machine previously identified, with the bushing receiver used to ensure the split bushing is not accidentally blown off course by the stream or streams of air used during the gap alignment process. Note that the air outlets may be configured as part of the mounting assembly, such as shown in the FIGS., or may in fact be air nozzles or other fittings on the outlet ends of the air tubes, that is, the ends opposite those ends of the air tubes attached to the air supply, as needed.

In the representative embodiment shown in the FIGS., the outlets 22*a* 22*b* 22*c* 22*d* are positioned below the existing feed rail bushing aperture 68 and prior to an inspection step by the inspection machine. In the fourth step 230 of the method, looking at the embodiment shown in the FIGS., the split bushing 80 passes into the bushing alignment hole 30 of the mount 100 and in the fifth step 240, the stream of air, typically compressed air, is blown through the outlets 22*a* 22*b* 22*c* 22*d* at the split bushing 82 inside the bushing alignment hole 30. In the sixth step 250, if the stream of air contacts the gap 82 of the split bushing 80, the bushing 80 rotates to position the gap 82 away from the outlet 22*a* 22*b* 22*c* 22*d*. The split bushing 80 then proceeds to be installed by the prior art press equipment into a part, after which the bushing circularity is tested by the prior art inspection machine.

The inventor notes that his method 200 is not reliant on the exact assembly 300 shown in the FIGS. The assembly 300 in its most simple configuration is one or more air tubes held in a use position by a mount configured to have one or more clips supporting and positioning the air outlets of the air tubes at slots or openings or vents formed into the bushing receiver with the vents sized, shaped and positioned so that the air outlets minimally correspond in number and position with the number and position of inspection areas use by the inspection machine. It is possible to devise a bushing receiver that can align the split bushing 80 for later inspection by different inspection machines having more or fewer inspection areas than the prior art inspection machine, so as to create a universal bushing receive that can be used with multiple inspection machines prior to the split bushing being installed into the part to be inspected.

The assembly 300 shown in the FIGS. is a representative embodiment designed for use with existing equipment in its original installed configuration, and the low-profile assembly 300 was created to fit within an existing space below the feed rail 60. For other arrangements, if there is sufficient space below the feed rail 60, the air source, tubing and air outlets can be arranged as needed and fitted onto existing equipment, although the inventor still believes that some type of bushing receiver is required to ensure that the stream of air from the vents does not displace the bushing 80 entirely from the manufacturing line. The bushing receiver may be a circular hole for instance or be as little as one or more pairs of opposed bars and with otherwise open sides serving as large vents. Hence, the assembly 300 and method 200 shown in the FIGS. are illustrative only and not meant to limit the invention to the specific examples shown in the FIGS. For instance, the inventor notes that the stream of air could be directed from above, below, horizontally or combinations thereof at the split bushing 80. The assembly 300 in its most simple form is comprised of air tubing and a mounting structure to hold the air tubing outlets in a desired position to blow streams of air at the split bushing 80 to reorient the gap 82 prior to installation during the manufacturing process.

The inventor has tested his assembly 300 and found that it significantly increased production efficiency by eliminating false bushing failure tests by the gap 82 randomly falling into one of the inspection locations for the machine. As tolerances for the split bushings are tight, elimination of the random placement of the gap 82 resulted in measurable productivity improvements.

It is to be understood that the above-described arrangements are only illustrative of the application of the principles of the present invention. Numerous modifications and alternative arrangements may be devised by those skilled in the art without departing from the scope of the present invention. Any reference to "bushing" within this disclosure is meant to refer to split bushings with a gap and the method 200 disclosed can be used with any equipment where the location of the gap of the split bushing may present problems and where the gap position is otherwise randomly assigned.

The inventor notes that the air supply typically suitable for use with the assembly 300 is compressed air, commonly used in many different manufacturing environments. The incoming air pressure for the assembly 300 is regulated and has been tuned specifically for the weight of the bushing to be aligned. For the embodiment shown, the split bushing is about 16 grams bushing, and requires 40 psi to move it according to the method disclosed. For a heavier bushing, the regulator is adjusted to allow more air. Ideally, the amount of air used is regulated to avoid waste.

In the present case, the prior art inspection machine uses compressed air to test the installed split bushing, in the specific instance after it is installed into a connecting rod, when the inspection machine blows compressed air on the installed bushing to test for air leaks. If air leaks are detected, as would happen if the gap 82 falls into one of the inspection locations, the part fails and is now marked as scrap material, whose cost is significantly more money than just a failed split bushing. The compressed air used by the inspection machine thus is not being use in any way to reposition the gap 82 of the split bushing 80 and the inventor is unaware of any other split bushing alignment equipment that uses compressed air to position the gap 82 of the split bushing 80. The inventor also notes that the stream of air could be continuously supplied or activated only when the split bushing 80 is sensed or otherwise its presence in the manufacturing line is understood and the stream of air can be turned on and off as needed.

I claim:

1. A method of aligning a gap of a split bushing using an assembly comprising a bushing receiver formed with a hole sized and shaped to receive the split bushing and at least one vent, the method comprising the steps of:

determining a number and location of inspection areas about a circumference of an installed split bushing as inspected by an inspection machine;

providing the assembly with at least a same number of vents in corresponding locations as the number and location of inspection areas;

providing an air supply to each vent of the bushing receiver;

feeding a split bushing into the bushing receiver;

blowing a stream of air through each vent into the bushing receiver as the split bushing travels through the bushing receiver; and rotating the gap of the split bushing away from a vent of the at least one vent when a respective stream of air contacts the gap.

2. The method in claim 1, wherein the step of determining identifies four inspection areas in spaced apart relationship.

3. The method in claim 1, wherein the step of providing an air supply is further comprised of using a single air supply source to blow each stream of air through each vent in the bushing receiver.

4. The method in claim 1, wherein the air supply is a compressed air supply and a pressure of each stream of air is calibrated according to a weight of the split bushing so as to be sufficient to turn the split bushing when the respective stream of air contacts the gap.

5. The method in claim 1, wherein the step of blowing occurs only when the split bushing is positioned within the bushing receiver.

6. The method in claim 1, wherein the step of determining identifies four inspection areas, the step of blowing uses four vents.

7. The method in claim 1, further comprising the step of:
installing the split bushing into a bushing-receiving part immediately after the step of rotating.

8. The method in claim 7, further comprising the step of:
testing the installed split bushing in the bushing-receiving part by the inspection machine at the inspection areas prior to further manufacturing
after the step of installing.

9. The method in claim 1, wherein a pressure measurement of each stream of air is 40 psi and a weight of the split bushing is 16 grams.

* * * * *